Feb. 5, 1935.  V. C. BOYDSTON  1,989,909

THERMOSTATIC MIXING VALVE

Filed May 19, 1933  3 Sheets-Sheet 1

WITNESSES

INVENTOR
Verne C. Boydston

Feb. 5, 1935.   V. C. BOYDSTON   1,989,909
THERMOSTATIC MIXING VALVE
Filed May 19, 1933   3 Sheets-Sheet 3

WITNESSES

INVENTOR,
Verne C. Boydston

Patented Feb. 5, 1935

1,989,909

UNITED STATES PATENT OFFICE 1,989,909

THERMOSTATIC MIXING VALVE

Verne C. Boydston, Seattle, Wash.

Application May 19, 1933, Serial No. 671,861

11 Claims. (Cl. 236—12)

My invention relates to improvements in thermostatic valves of the form known as water mixing valves, in which water of low and high temperature from separate conduits is supplied to the valve and a mixture of intermediate temperature may be delivered, and the object of my invention is to provide a valve device having means for controlling the proportional mixing of the supplied liquids so that the delivery temperature may be predetermined; that has convenient external means for adjusting the delivery temperature; that has self contained means for preventing the circulation of liquid from one source of supply into the conduit of the other source and vice versa; that has simple and rugged operating mechanism, all of which mechanism is constructed and arranged to be attached to a cover part, easily separable from a base part designed to receive all pipe connections, whereby said operating mechanism may be removed for access without disturbing said pipe connections; that has provision for renewal of valve parts subject to wear; that is adapted to be so mounted that, with said cover part flush with a wall and said base part imbedded therein, all piping connections will be concealed from the front of said wall or with said base part relatively close to the face of a wall and said pipe connections substantially flush therewith; and that is relatively compact in form and of symmetrical and pleasing appearance.

These objects I attain by the construction and arrangement of parts shown in the drawings and hereinafter more particularly described. That which I believe to be new will be pointed out in the claims.

In the accompanying drawings:—

Figure 1:
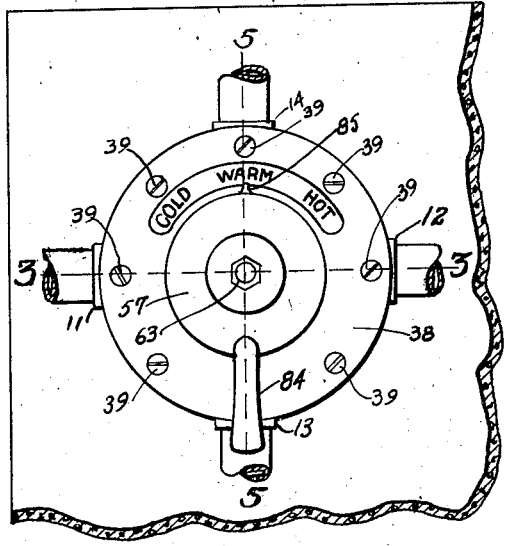
Fig. 1 is a front elevation of my improved thermostatic valve mounted on a side wall with the piping connections exposed.
Figure 2:
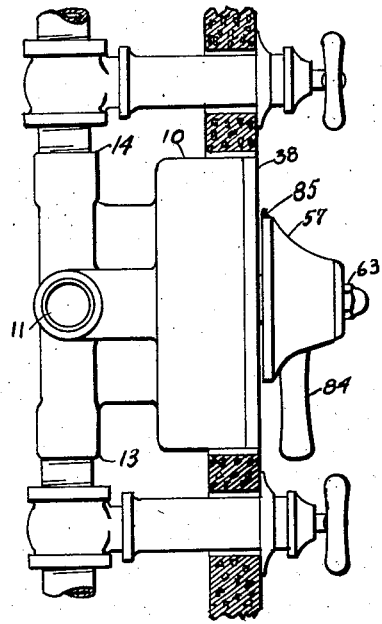
Fig. 2 is a side elevation of the valve with the rear or base part imbedded in the face of a wall and the piping concealed behind said wall.
Figure 6:
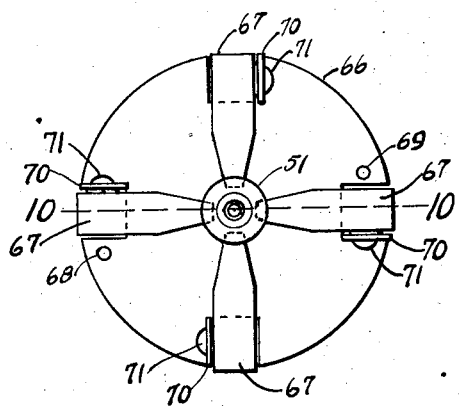
Fig. 6 is a rear view of the thermostatic motor.

My improved thermostatic valve comprises a casing 10 which is provided with a pluraltiy of openings for connection with supply and delivery conduits, here shown as a pair of diametrically opposite inlet openings 11 and 12, for hot and cold water respectively, and a pair of outlet openings 13 and 14 for delivery of tempered water. The purpose of the two outlet openings is to facilitate the piping of the valve in installations in which it may be desired to deliver tempered water to both a shower head and a tub, as shown in Fig. 2.

The inlet opening 11 communicates with a cylindrical chamber 15 through a passage 17, said chamber being constricted at its rearward end to form a seat for a ball 19 and said ball being pressed against said seat by a spring 21. A cylindrical screen 23, open at both ends, is held concentrically in chamber 15 by seating in a counterbore 23—A in casing 10 and counterbore 25 in a plug 27, said plug being screwed into the threaded open end of chamber 15. Similarly, the inlet 12 communicates with a chamber 16 through a passage 18 having a seat for a ball 20 and a spring 22 for said ball. A similar screen 24 is seated in counterbores 24a and 26 of the casing 10 and plug 28 respectively. The inside diameter of the said screens is sufficiently greater than the diameter of the said balls to provide lateral guidance for the balls and their springs.

Figure 5:
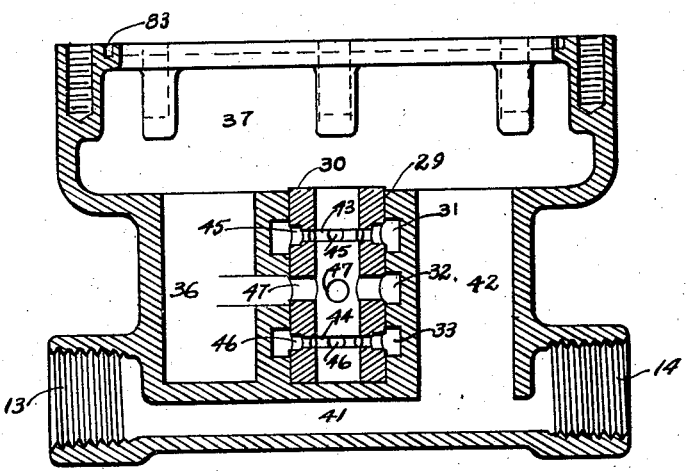
Fig. 5 is an enlarged sectional view of the rear or base part taken on the line 5—5 of Fig. 1.
Figure 8:
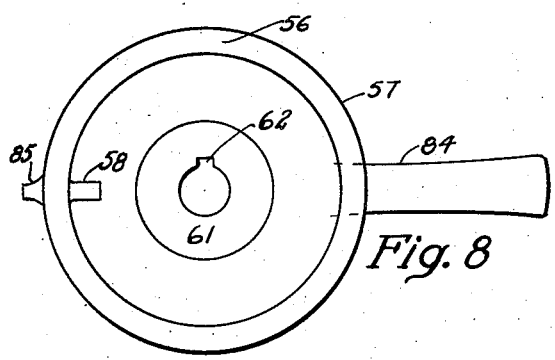
Fig. 8 is a rear view of the adjusting handle.

Adjacent the chambers 15 and 16 and concentric with the body of casing 10 is a bore 29 adapted to receive a valve bushing 30. The bore 29 is provided with axially spaced, continuous, concentric grooves 31, 32 and 33, cored or machined in said bore, each groove being provided with a connecting passageway for the inlet or outlet of water. Chamber 15 communicates with groove 31 through a passage 34; chamber 16 with groove 33 through a passage 35; and the groove 32 has a discharge passage 36a and 36 connecting with a chamber 37, as best shown in Fig. 5. The outlet openings 13 and 14 are connected together by a passage 41 and said passage is also in connection with chamber 37 through a passage 42, as best shown in Fig. 5.

The bushing 30, held in place in bore 29 by its forced fit therein, is provided with axially spaced grooves 43 and 44 formed in the bore thereof, said grooves being in approximate alignment with grooves 31 and 33, respectively, of the casing 10. A plurality of spaced, radially inwardly directed holes 45, in bushing 30, intersecting the groove 43, connect the annular groove 31 in casing 10 with the groove 43, and similar holes 46 connect the grooves 44 and 33 of the bushing and casing, respectively. Axially intermediate holes 47 in bushing 30 align with groove 32 of the casing to provide outflow from an annular space 74 surrounding the waist 50 of a valve 48, slidable in said bushing.

I provide the above described bushing as a means of renewing a wearable part of the mechanism, but its inclusion is not essential to its operation. It may be seen by inspection of the drawings that the valve 48 may be made to co-operate directly with the grooves 31 and 33 as ports. Thus the operation of the valve would be identical as though provided with the bushing described.

The piston type valve 48 is constructed with axially spaced pistons, closely fitting the bore of bushing 30, separated by a waist 50 of lesser diameter co-operating with the bore of bushing 30 to form a mingling chamber 74 for the water admitted from ports 43 and 44. The spacing of the inner margins of the pistons of said valve is in definite relation to the spacing of the adjacent margins of grooves 43 and 44 so that, according as the axial position of said valve may be adjusted, delivery of water from either of said ports 43 or 44 may be substantially blocked while the opposite port is widely opened or varying proportions from both sources may be admitted into the space 74. The valve 48 is adapted to be automatically positioned axially in the bushing by a thermostatic motor, to be described later, through a rod 52 passing through a concentric hole of said valve and having a pinned or other detachable connection therewith at the rearward end of said valve.

The cover 38, attached to the casing 10 as by means of screws 39 and having a suitable gasket 40 interposed between the abutting faces of said cover and casing, closes a cavity formed in said casing to form a chamber 37, in which is located a thermostatic motor. I prefer to provide the cover with a circular tongue 82 co-operating with a circular groove 83 in the casing, in which the gasket is placed, as providing means other than the cover screws for accurately centering the cover thereon and retaining the gasket therein. Said cover has a centrally located, outwardly projecting boss 84 and a hole therethrough for closely receiving a shaft 53, rotatable therein, and means for sealing said shaft against the escape of water thereabout, such as a conventional packing nut 54 and suitable packing.

The shaft 53 has formed at its rearward end a shallow head 59 to position outwardly against the face of a recess formed in the cover so that the head is substantially flush therewith. The outward end of said shaft is formed with a shoulder 60 adapted to co-operate with a face 61 of the interior of an adjusting handle 57 to position said handle axially thereon. A keyway 62 in the handle 57, and a lug on the shaft which fits slidingly in the keyway, co-operate to secure rotation of said shaft by means of said handle. It will be seen that the assembly of the shaft 53 and the handle 57, as by means of a nut 63, secures said shaft against axial movement through the co-operation of the face 56 of said handle with the outer face 55 of the cover 38 while rotary movement of said handle and shaft is allowed.

The handle 57 is in the form of a hollow bell shaped piece having its cavity adapted to cover the packing nut 54, and having a radially extending handle arm 84 for convenience of its rotation for adjustment of the temperature of delivered water. A pointerlike projection 85 opposite the handle arm 84 co-operates with wording or a temperature scale on the face of the cover 38 to indicate the position of the handle. To limit the rotary movement of the handle I provide a lug 58 cast integrally with said handle and projecting from the inner face thereof so as to bring its end approximately flush with the face 56, co-operating with stop screws 80 and 81 inserted into threaded holes provided therefor on the outer face of the cover 38. The screws 80 and 81 project outward into the path of said lug 66 and are adapted to engage said lug to stop the rotation of the handle 57.

Figure 7:
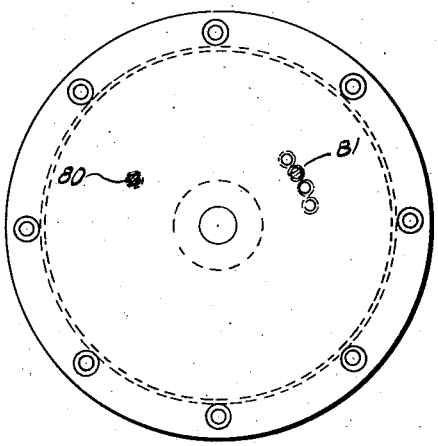
Fig. 7 is a front view of the cover with the adjusting handle removed.

In the embodiment of my invention the construction and arrangement of the parts is such that to deliver cold water the handle is rotated in a counterclockwise position and; conversely, for the delivery of hot water the handle is moved to the extreme clockwise position. Intermediate positions deliver water of intermediate temperatures. To provide for a limited adjustment of the maximum delivery temperature I provide a plurality of threaded holes, circumferentially spaced, for the insertion of screw 81, see Fig. 7. The spacing of said holes is such that an increase of approximately ten degrees in delivery temperature may be had by inserting said stop screw in the next adjacent hole in clockwise direction.

The thermostatic motor, previously mentioned, comprises an axially adjustable base plate 66, thermostatic springs or strips 67 attached thereto near the periphery thereof, as by means of brackets 70 integrally formed therewith, the movable ends of said strips directed toward the center of said plate and substantially parallel thereto, a bus piece 51, for combining the forces of the movable ends of the plurality of said strips, and means for positioning the assembly axially within the chamber 37 through the rotation of the shaft 53.

Figure 3:
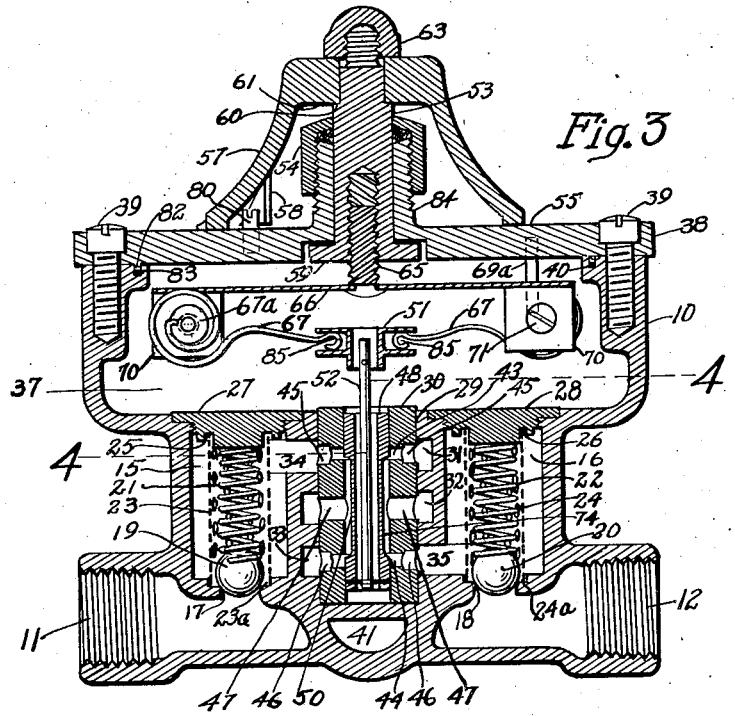
Fig. 3 is an enlarged sectional elevation of the complete valve taken on the line 3—3 of Fig. 1.
Figure 4:
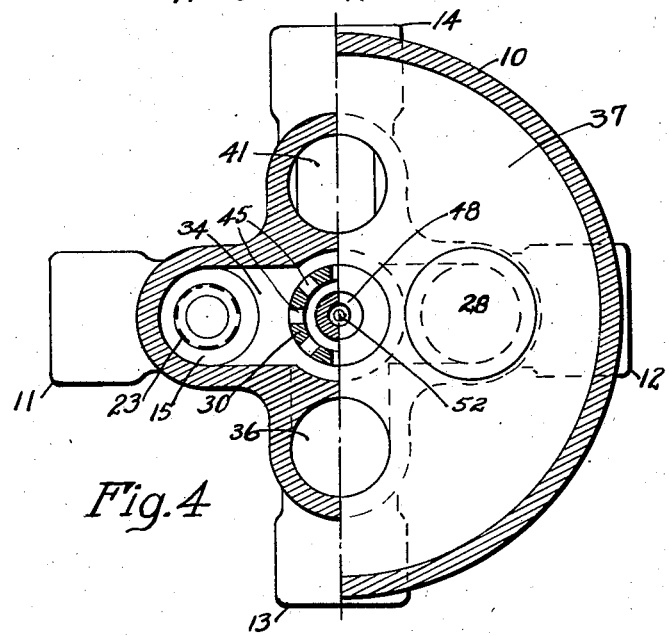
Fig. 4 is a sectional view of the rear or base part of the casing taken on the line 4—4 of Fig. 3.

The plate 66 has, projecting forwardly at its center and perpendicular to the face thereof, a screw 65 and the shaft 53 is provided at its rearward end with a concentric threaded hole adapted to receive said screw. Said screw co-operates with said shaft as a guide to maintain and support said plate substantially parallel with the face of the cover 38 in any axially adjusted position of said plate. Diametrically opposite holes 68 and 69, near the margin of said plate, co-operate with rearwardly projecting pins attached to the interior face of said cover, (one of which is shown and indicated by the numeral 69a in Fig. 3) to prevent rotation of said plate while allowing axial sliding movement thereon.

Thus the rotary motion of the shaft 53 within the limits of travel provided by the handle 57 and its stops adjusts the axial position of the thermostat to predetermine the temperature of the delivered water.

The brackets 70, for supporting the plurality of thermostatic strips, have their upturned faces formed parallel with radii of said plate and are offset therefrom approximately half the width of said strip.

The strips of thermostatic metal 67 are formed into spirals having a tangential outer end, the inner end of the spiral being permanently secured to a cylindrical hub 67a. Said hubs are clamped to the brackets 70 by means of screws 71 passing through holes in said brackets and screwed into threaded concentric holes in the hubs. Thus, in initially assembling the elements on the base 66 or in subsequent readjustment, by loosening the screw 71, the hub may be rotated to bring the outer end to a definite location with respect to the base 66, and the screw 71 then tightened, locking the hub in the adjuted position.

Figure 10:
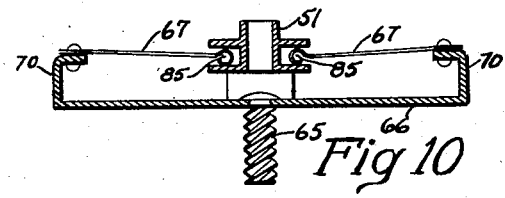
Fig. 10 is an enlarged sectional view of a thermostat taken on the line 10—10 of Fig. 6, illustrating an alternative form of the bimetallic strip.
Figure 11:
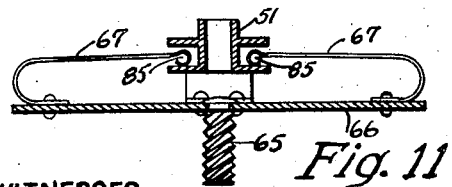
Fig. 11 is a sectional view of a thermostat, taken on the line 10—10 of Fig. 6, illustrating a further variation in form of the bimetallic strip.

The thermostatic strips may also have the form of a flat cantilever or may be U-shaped without impairing the operation or diverging from the spirit of the invention. Such arrangements are illustrated in Fig. 10 and Fig. 11 respectively.

The movable ends of the thermostatic strips are formed to a tapering point for clearance from adjacent strips where they converge towards the center of the supporting plate 66 and are also formed with a spherical or cylindrical terminus 85 adapted to be engaged between the flanges of the bus piece 51. The thermostatic strips, whether of flat cantilever, U-shaped or spiral form, are so mounted that increase of temperature will cause the deflection of said strips rearwardly of the casing, i. e., the high expansive element of the thermostatic strip is on the inside of the spiral.

The material of the thermotatic strips is of well known composition and comprises a plate or sheet formed of two sheets of metal having high and low coefficients of expansion and requires no further description.

For clarity of illustration the drawings show the employment of four such strips mounted as in the foregoing description but I prefer to employ a greater number of strips of thin material—preserving the radial arrangement of said strips—as giving the most sensitive construction.

The bus piece 51 comprises a short cylindrical hollow member provided with a pair of axially spaced circular flanges. Into this hollow member projects the forward end of the connecting rod 52, previously mentioned, and it is pinned in place therein as clearly shown in Fig. 3. The two flanges are adapted to receive therein between the termini 85 of said thermostatic strips, also previously described, and thereby transmit the combined deflections of said strips to the valve 48 through the interposed rod 52.

Figure 9:
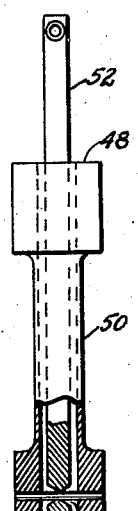
Fig. 9 is an enlarged view of the valve, partly in section, illustrating a means of connection with a connecting rod.

To eliminate all possible sources of friction, the bus piece 51 is not provided with guides to retain it in a central position or maintain its parallelism with the plate 66 and therefore some lateral movement or tilting of this member, through unequal action of the strips acting thereon, is anticipated and provided for in the manner of connection to valve 48 to prevent the above mentioned misalignment being transmitted to the valve and thereby causing side binding and sticking of the valve. In effect a universal joint connection between the said parts 48 and 51 is made by forming the holes in said parts adapted to the reception of said rod of considerable clearance about the rod and positioning the pins, at opposite ends of the rod, at right angles to each other. The holes in rod 52 are further modified to assist in freedom of movement by the construction shown at 86 in Fig. 9, the holes being tapered from both sides, thereby leaving a very narrow bearing on the pin. Thus the bus piece 51 may take a position eccentric to the valve or be tilted in any direction without binding said valve while its mean axial movement is transmitted thereto.

The thermostatic motor, being supported within the chamber 37 and of open construction, will be practically instantly responsive to changes in temperature of the water mixture passing through the chamber but, owing to the distributed form of the elements of the thermostat and the progressive deflection of the elements, no separate damping of its action such as a dashpot is necessary to prevent hunting or overshooting. That is, the flow of the water through the chamber, from inlet to the outlet, is at a relatively low velocity due to its comparatively large transverse area and thus a change of temperature of the water inflowing will affect a portion of the elements adjacent the inlet and cause a proportionate corrective movement of the valve before the changed temperature has affected the remainder of the elements so that the response of the thermostat, unhampered by any damping mechanism, is immediate and proportional to the degree of temperature change.

The valve 48, previously described, is practically balanced in operation, that is to say, the pressure of water inflowing from ports 43 and 44, independently or simultaneously, and outflowing through apertures 45, whatever the position of said valve, exerts no axial thrust on the valve. Any leakage around the valve into the space provided for necessary rearward travel of said valve, is released into the chamber 37 through the annular space surrounding the valve stem 52 so that pressure on both ends of the valve is equalized.

In flowing through the device the hot water enters through the opening 11 from the connected conduit, through the passage 17, lifting ball 19 from its seat and through the screen 23 into the chamber 15; thence through the passage 34 into the annulus 31, through holes 45 into the annulus 43 of bushing 30 and into the mingling space 74 between piston ends of valve 48 and outwardly through the holes 47 and into the annulus 32; thence by the passages 36a and 36 into the chamber 37. Similarly the cold water enters through the opening 12 from its conduit, through the passage 18, lifting ball 20, through the screen 24 into the chamber 16; thence through the passage 35 into the annulus 38, through holes 46 into the annulus 44 of bushing 30 and into the previously mentioned mingling space 74; thence outwardly into the chamber 37. The tempered water passes from chamber 37 by way of passage 42 into passage 41 and thence into either discharge conduit which may be open, having circulated freely about the thermostatic motor in chamber 37.

The operation of the valve may be described in detail as follows: The valve being connected to sources of hot and cold water and one of the discharge valves opened, the adjusting handle may be assumed to be turned in a clockwise direction to deliver warm water. The plate 66 is drawn forward through the rotation of screw 65, carrying with it valve 48, blocking the cold water port 44 and opening wide the hot water port 43. As the temperature of the water in the mixing chamber 37 rises, the thermostat forces the valve 48 rearwardly thereby throttling the hot water at the port 43 and admitting cold water at port 44 until the proportionate mixture attains the temperature for which the adjustment is set. Thereafter any variation in temperature of either supply will affect the temperature of the mixture, resulting in a movement of the valve to correct the proportion and maintain the temperature.

It will be seen that should the pressure in one supply conduit fall below that of the other, the check ball will prevent a reverse flow of water into that conduit.

Since the primary function of the valve is to maintain the temperature of the delivered water within very close limits a condition may occur in which the valve would necessarily operate to cut off entirely the flow of the hot water; as for instance, the valve being set and in use to deliver a moderately warm flow requiring a mixture of hot and cold water, a considerable reduction or complete loss of pressure in the cold source occurs. In order that the valve shall substantially shut off either hot or cold water it is desirable that valve 48 be a very close fit in bushing 30 as may be consistent with its free movement therein; also that said valve and bushing be of considerable hardness to withstand erosion of water at high velocities and possibly carrying abrasive sediment. Attention is directed to the coating of the co-operating surfaces of said valve and bushing with a metal of extreme hardness, such as chromium by the electroplating process.

I claim as my invention:—

1. In combination in a thermostatic valve, a casing, a rotatable shaft supported axially in said casing, a thermostat connected with said shaft, means for holding said thermostat against rotation during the rotation of said shaft, and a balanced valve connected with the thermostat, the axes of the thermostat and valve being in alignment.

2. In combination in a thermostatic valve, a casing having a pair of inlet passages, a valve controlling both passages, a shaft axially supported in said casing, a thermostat axially adjustable by rotation of said shaft and a universally jointed connection between said thermostat and said valve.

3. A thermostatic valve comprising a casing and a cover, a shaft supported for rotation by said cover and axially positioned therein and means for limiting the rotation of said shaft to less than one revolution, an axially adjustable thermostat, guiding means for preventing rotation thereof, an axially adjusting connection between said shaft and said thermostat and a balanced piston valve operatively connected to said thermostat through a universally jointed connection.

4. In combination in a thermostatic valve, a casing having a pair of inlet passages, a valve controlling both passages, said casing having chambers interposed between said inlet passages and said valve, and each chamber containing a check valve and a screen, each of said screens providing lateral guidance for one of said check valves.

5. In combination in a thermostatic valve, a casing having a pair of inlet passages and having chambers formed within the rearward or body portion of said casing adjacent said inlet passages, a check valve and a screen in each of said chambers and removable covers for said chambers providing access, from the forward part of said casing, to said chambers, said covers also providing axial and lateral location for said screens.

6. A thermostatic valve device comprising in combination a casing and a cover therefor, mechanism housed in said device comprising a shaft adjustably secured in said cover, a thermostat adjustably connected with said shaft, a valve member in alignment with said shaft and connected with said thermostat so as to be movable therewith, said casing having separate chambers for the admission to the device of fluids of different temperatures and passages from said chambers controlled by said valve member, a check valve normally closing each of said chambers, and a screen in each chamber serving as a guide for the check valve therein during the movements of such valve.

7. In combination in a thermostatic valve, a casing, a valve member adapted to control the flow of two streams of fluid to the casing, a thermostatic device comprising a base and a plurality of radially directed thermostatic elements, means for adjustably connecting the outer end portions of said elements with said base, said connecting means for each element comprising an adjustable hub carried by said base, means for securing a bimetal strip thereto and means for securing the hub in different adjusted positions, and means for connecting the inner ends of said elements with said valve member.

8. In a thermostatic valve comprising a casing and a cover therefor, an axially adjustable thermostat, hot and cold inlets and a valve controlling both inlets; a removable valve bushing comprising a hollow cylinder having axially spaced grooves on the interior thereof, a plurality of openings radial to said grooves for the admission of liquids thereto and radial openings intermediate said grooves for the exit of the mixture, and a double ended piston valve closely fitting and slidable within the bore thereof, the adjacent margins of the piston valve co-operating with the adjacent margins of said grooves to regulate or cut off the flow of liquid, substantially as described.

9. In combination in a thermostatic mixing valve, a casing, a rotatable shaft supported in said casing, means for limiting the rotation of said shaft to less than one revolution, a thermostat axially adjustable by rotation of said shaft and a balanced piston valve connected with the thermostat by means of a universally jointed connection, the axes of the valve and thermostat being in line.

10. In a thermostatic valve having radially directed thermostatic elements; a spherical terminus for each element and a doubly flanged piece for engaging said termini, substantially as described.

11. In a thermostatic valve having radially directed thermostatic elements; a circular terminus for each element, having the axis of said terminus perpendicular to the line of motion and parallel to the axis of the element and a doubly flanged piece for engaging said termini, substantially as described.

VERNE C. BOYDSTON.